US007762112B2

(12) United States Patent
Brücher et al.

(10) Patent No.: US 7,762,112 B2
(45) Date of Patent: Jul. 27, 2010

(54) FITTING DEVICE FOR PRODUCING THE ARRANGEMENT FOR LOCKING A SEALING ELEMENT, ARRANGED AT THE FRONT END ON A ROTOR OF A TURBINE, AGAINST A DISPLACEMENT IN THE CIRCUMFERENTIAL DIRECTION, AND METHOD OF PRODUCING SUCH A LOCKING ARRANGEMENT

(75) Inventors: Marcus Brücher, Berlin (DE); Christian Bäumler, Falkensee (DE); Andreas Föhrigen, Berlin (DE); Detlef Gruhn, Berlin (DE); Armin Hülfenhaus, Langenfeld (DE); Adam Przybyla, Ratingen (DE); Sabine Rintzel, Mülheim an der Ruhr (DE); Melanie Uckert, Berlin (DE); Claus Vögelin, Mülheim an der Ruhr (DE); Uwe Wegmann, Wustermark (DE)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 11/977,460

(22) Filed: Oct. 25, 2007

(65) Prior Publication Data

US 2008/0173062 A1 Jul. 24, 2008

(30) Foreign Application Priority Data

Oct. 25, 2006 (EP) .................................. 06022335

(51) Int. Cl.
*B21C 51/00* (2006.01)
*B64C 11/04* (2006.01)

(52) U.S. Cl. ............................ 72/31.1; 72/296; 72/316; 72/380; 29/889.21

(58) Field of Classification Search .................. 72/31.1, 72/293, 295, 296, 297, 298, 316, 379.2, 380, 72/386, 457, 458, 481.6, 481.7; 29/889.1, 29/889.2, 889.21; 416/219 R, 220 R, 221
See application file for complete search history.

(56) References Cited

U.S. PATENT DOCUMENTS

| | | | | |
|---|---|---|---|---|
| 3,096,074 | A * | 7/1963 | Pratt et al. | 416/215 |
| 3,248,921 | A * | 5/1966 | Trout | 72/319 |
| 3,397,865 | A * | 8/1968 | Shaw et al. | 416/221 |
| 3,440,706 | A * | 4/1969 | Ostergren et al. | 29/243.5 |
| 3,501,249 | A * | 3/1970 | Scalzo et al. | 416/95 |
| 3,656,865 | A | 4/1972 | Spears, Jr. | |

(Continued)

FOREIGN PATENT DOCUMENTS

EP 1 703 078 A1 9/2006

(Continued)

*Primary Examiner*—Edward Tolan

(57) ABSTRACT

The invention relates to a fitting device for producing the arrangement for locking a sealing element, arranged at the front end on a rotor of a turbine, against a displacement in the circumferential direction, the sealing element locking moving blades arranged on the rotor against an axial displacement. Furthermore, the invention comprises a method of producing the arrangement for locking a sealing element, arranged at the front end on a rotor of a turbine, against a displacement in the circumferential direction. The quality of the fitting can be further increased by means of a modular, mobile fitting device which secures the sealing element for the duration of the bending operation.

19 Claims, 6 Drawing Sheets

U.S. PATENT DOCUMENTS

| | | | | |
|---|---|---|---|---|
| 4,344,740 | A * | 8/1982 | Trenschel et al. | 416/221 |
| 7,264,447 | B2 * | 9/2007 | Ono et al. | 416/193 A |
| 7,415,763 | B2 * | 8/2008 | Miosga et al. | 29/889.21 |
| 7,530,254 | B2 * | 5/2009 | Bilstein et al. | 72/458 |

FOREIGN PATENT DOCUMENTS

| | | |
|---|---|---|
| GB | 905 582 | 9/1962 |
| GB | 954 323 | 4/1964 |

* cited by examiner

FITTING DEVICE FOR PRODUCING THE ARRANGEMENT FOR LOCKING A SEALING ELEMENT, ARRANGED AT THE FRONT END ON A ROTOR OF A TURBINE, AGAINST A DISPLACEMENT IN THE CIRCUMFERENTIAL DIRECTION, AND METHOD OF PRODUCING SUCH A LOCKING ARRANGEMENT

CROSS REFERENCE TO RELATED APPLICATIONS

This application claims the benefits of European application No. 06022335.1 filed Oct. 25, 2006, and in incorporated by reference herein in its entirety.

FIELD OF INVENTION

The invention relates to a fitting device for producing the arrangement for locking a sealing element, arranged at the front end on a rotor of a turbine, against a displacement in the circumferential direction, the sealing element locking moving blades arranged on the rotor against an axial displacement. Furthermore, the invention comprises a method of producing the arrangement for locking a sealing element, arranged at the front end on a rotor of a turbine, against a displacement in the circumferential direction.

BACKGROUND OF THE INVENTION

A bending device for bending over plates for a compressor is known from EP 1 703 078 A1. The plates serve to fix compressor moving blades pushed into axial slots. Each plate is arranged between the slot bottom of the axial slot and the root of the moving blade inserted therein and in this case projects slightly beyond the axial slot on both sides. The moving blade can be locked against a displacement in the axial direction by bending over the projecting sections. To this end, the bending device is first inserted into a clearance space between two compressor disks and is secured in said clearance space by means of a restraining element. The projecting section of the plate is then bent over by actuating a radially displaceable punch.

Furthermore, the fastening of sealing plates to the side faces of turbine disks is known from GB 905 582.

Furthermore, rotors of gas turbines are known in which turbine moving blades arranged at the outer circumference in moving-blade retaining slots are locked against axial displacement by means of sealing plates. FIG. 1 shows such an arrangement in plan view and FIG. 2 shows such an arrangement in cross section along section line II-II in FIG. 1. Two adjacent sealing plates 16 are provided for each moving blade 14 to be locked against an axial displacement inside its moving-blade retaining slot 12, said sealing plates 16 each covering half the front-end opening of the moving-blade retaining slot 12. Each sealing plate 16 is inserted at its radially inner end 18 in a circumferential slot 20 provided at the front end on a rotor disk 19 and at its radially outer end 22 in a locking slot 24 which is provided on the underside 26 of a platform 28 of the moving blade 14. In order to lock each sealing plate 16 against a displacement in the circumferential direction U, a rectilinear sheet-metal strip 30 extending essentially in the radial direction of the rotor 23 is fastened to each sealing plate 16. Each sheet-metal strip 30 ends at its radially outer end 32 in an evenly converging tip 34. There are chamfered edges 36 on the platforms 28 of the moving blades 14, two opposite edges 36 of directly adjacent moving blades 14 in each case forming a recess 38 which tapers to a point and into which the tip 34 of the sheet-metal strip 30 can project for locking the sealing plates 16 against a displacement in the circumferential direction U and can bear laterally against the edges 36.

In addition, the sealing plates 16 provide for separation of two regions 37, 39 (FIG. 2) in which cooling air can occur on the one hand and an undesirable hot-gas flow can occur on the other hand.

To fasten the sheet-metal strips 30 to the sealing plate 16, two parallel slots 40, through which the sheet-metal strip 30 already pre-bent in a U shape is inserted, are provided in said sealing plate 16. That end 41 of the sheet-metal strip 30 which is opposite the tip 34 is bent into the position shown in FIG. 2 for fastening the sheet-metal strip 30 before the sealing plate 16 is fitted on the rotor disk 19.

After the fitting of the moving blades 14 in the rotor disks 19, the sealing plates 16 together with the pre-fitted sheet-metal strips 30 are successively threaded into the endlessly encircling circumferential slot 20 arranged on the rotor disk 19 and into the locking slot 24 arranged on the underside 26 of the platform 28. The sealing plates 16 are positioned along the circumference of the circumferential slot 20 in such a way that each sheet-metal strip 30 is opposite a recess 38. The tips 34 of the sheet-metal strips 30 are then bent into the recesses 38 in order to rule out the possibility of a displacement of the sealing plates 16 in the circumferential direction U.

The tip 34 of the sheet-metal strip is bent in by means of a lever 48 having a vertically adjustable prism 44. The lever 48 is placed into a groove or onto a corner of the rotor disk 19. After the prism 44 is oriented relative to the outer end 32 of the sheet-metal strip 30, the lever 48 is pressed manually against the sheet-metal strip 30, as a result of which the bending operation is initiated. The movement of the lever 48 is continued until the outer end 32 is fitted in place in the recess 38 and bears against the sealing plate 16. The bending operation is then ended.

In addition, it is known to use an essentially L-shaped sheet-metal strip for locking the sealing plate instead of a sheet-metal strip extending in the radial direction of the rotor. The L-shaped sheet-metal strip comprises a first leg which extends essentially in the circumferential direction of the rotor and a second leg which engages at the inner end of the sealing plate in an aperture provided for this purpose and arranged on the rotor.

On account of the sealing elements, displaceable in the circumferential direction, inside the circumferential slot provided in the rotor disk, it is no easy matter to bend the second leg of the L-shaped sheet-metal strip into the aperture provided for it, especially since the sheet-metal strips are also to be bent in without interruption in order to prevent work-hardening of its material in the meantime.

SUMMARY OF INVENTION

The object of the invention is therefore to provide a fitting device for producing the arrangement for locking a sealing element against a displacement in the circumferential direction and to specify a method for this purpose, by means of which it can be ensured that the sealing elements are not damaged during the fitting process and the sheet-metal strips are bent in as prescribed.

The object relating to the subject matter is achieved by a fitting device and the object relating to the method is achieved by the method as claimed in the claims.

The invention proposes that the fitting device for producing the arrangement for locking a sealing element, arranged at the front end on a rotor of a turbine, against a displacement in the circumferential direction, the sealing element locking moving blades arranged on the rotor against an axial displacement, comprise a clamping device for fastening the fitting device to the rotor, a bending device which is fastened to the clamping device and has a punch, movably mounted on it, for producing the locking arrangement by bending a section of a sheet-metal strip arranged on the sealing element into an aperture provided on the rotor, and a fixing means for locking the sealing element against an undesirable displacement in the circumferential direction during the bending-in operation. To produce the arrangement for locking the sealing element, arranged at the front end on the rotor of the turbine, against a displacement in the circumferential direction, the following production steps are therefore to be carried out one after the other:

First the sealing element provided with a pre-fitted sheet-metal strip is to be arranged on the rotor and the fitting device is to be placed against the rotor.

Then the fitting device is fastened to the rotor, after which the sealing element is temporarily fixed against a displacement in the circumferential direction of the rotor by the fixing means.

Then, by means of a bending device fastened to the clamping device, a section of the sheet-metal strip is bent into an aperture provided on the rotor by said bending device pressing the punch movably mounted on it against the section of the sheet-metal strip until the latter is in the aperture provided for it.

The sheet-metal strip is of essentially L-shaped design and extends in the circumferential direction with its first leg provided for the fastening. The second leg provided for the locking extends in the radial direction. However, before the fitting of the sealing element, the second leg of the already pre-fitted sheet-metal strip still projects from the sealing element. To complete the fitting of the sealing element, it is necessary for the second leg to be bent into the aperture as a section of the sheet-metal strip. The operation for bending the section is effected in such a way that said section is bent about a radial axis of the rotor. It is only by the operation for bending the section that the radial leg of the sheet-metal strip is placed against the sealing element.

With the fitting device, and accordingly by the production steps being carried out, it is ensured that the sealing element is not displaced along the circumferential slot during the operation for bending the sheet-metal strip. The consequence of such a displacement could be that the section to be bent in, namely the second leg of the sheet-metal strip, cannot be bent into the aperture provided for it, but rather is blocked by the projections which are provided on the rotor disk for forming the aperture. An especially reliable operation for bending in the sheet-metal strip can therefore be ensured with the invention. In addition, it is also ensured that the sheet-metal strip can be bent into the aperture without interruption in order to prevent work-hardening of the material. The bending-in of the sheet-metal strip by bending movements carried out one after the other is therefore not necessary. Provided that a sheet-metal strip bent in several steps may not be used at all inside the gas turbine, the waste of sheet-metal strips can also be reduced with the present invention. As a result, it is likewise not necessary to replace such a sheet-metal strip.

Advantageous configurations of the invention are specified in the subclaims.

The fixing means advantageously comprises an adjustable lever which has a stop element coupled thereto and by means of which the sealing element can be pressed against the rotor. The stop element can be displaced in the axial direction of the rotor by means of the adjustable lever and can thereby press the sealing element against a side wall of the circumferential slot. On account of the sealing element being restrained together with the side wall of the circumferential slot, the sealing element is fixed temporarily, for the operation for bending in the sheet-metal strip, such that the force for bending in the sheet-metal strip, which also acts in the circumferential direction, does not bring about a corresponding displacement of the sealing element.

In order to design the fitting device so as to be adaptable to different geometrical boundary conditions of the rotor, said fitting device is of modular construction. The clamping device is releasably fastened to the bending device. The fitting device can be fastened to different turbine stages using different clamping devices, each clamping device being adapted to the surrounding geometry of the respective turbine stage.

In a further advantageous configuration, the clamping device comprises at least one restraining means which can be actuated by a respective restraining lever and can be restrained together with the rotor. The bending device is fixed between two rotor disks by the restraining means. The clamping device can also be designed in such a way that contact with the sealing tips of the rotor is avoided in order not to damage said sealing tips.

Alternatively, the restraining means can also enclose an undercut of the rotor which is provided in a further circumferential slot of the rotor. However, the restraining means can also be restrained between two side walls of the further circumferential slot of the rotor in order to lock the clamping device.

In order to fasten the fitting device at a intended position, said fitting device has a positioning aid, by means of which the bending device can be positioned in the circumferential direction of the rotor in a defined manner. In this case, the positioning aid is designed as a screw, the thread-side end of which can be placed against a lug or projection provided on the rotor. With the proposed measure, the bending device can be exactly oriented in particular relative to the aperture in which the section of the sheet-metal strip is to be bent in place. It is particularly advantageous if the lug or the projection, against which the screw can be placed by displacing the fitting device, partly defines the aperture which is provided for a directly adjacent sealing element for the axial locking. On account of the endless circumference, a reference present on the rotor for positioning the fitting device can therefore be used for each sealing element in an especially favorable manner.

The configuration of the fitting device which comprises a setting aid for setting the position of the sealing elements in the circumferential direction is particularly advantageous. After the fitting device has been secured exactly on the rotor in the circumferential direction, the setting aid helps to exactly position the sealing element along the circumference of the rotor. The setting aid is preferably designed as a screw-on setting element, the free end of which serves as a stop for a projection provided on the sealing element. Since the fitting device can be positioned with reference to the aperture into which the section of the sheet-metal strip is to be bent, and since the sealing element can be positioned in the circumferential direction of the rotor using the setting aid firmly arranged on the fitting device, the exact position of the sealing element relative to the rotor can thereby be reliably predetermined. As a result, the section of the sheet-metal strip can be bent exactly into the aperture provided for it during the bending-in operation. In other words: the sheet-metal strip section can thereby be bent into the aperture in a single bending operation; interruption of the bending operation, which would lead to undesirable work-hardening of the material, can therefore be ruled out.

Either the punch required for bending the sheet-metal strip can be pivoted from its rest position in a lever-like manner about a longitudinal axis extending transversely to the axial direction of the rotor or the punch can be displaced from its rest position in the axial direction of the rotor by a stroke necessary for bending the sheet-metal strip. In the first case, the introduction of force to that section of the sheet-metal strip which is to be moved can be effected over a large area in a lasting manner during the bending-in operation, such that a deformation of the sheet-metal strip occurs only in the desired region—close to the slot. In addition, the punch in this configuration slides to a comparatively small extent along that section of the sheet-metal strip which is to be bent in.

In order to effectively prevent a deformation of the sealing element, for example buckling, the fitting device can be provided with a stop for limiting the punch movement. An inadmissibly large movement of the punch can therefore be limited, the stop predetermining an end position of the punch during maximum bending of the sheet-metal strip.

If the punch can be driven manually via an actuating lever, said punch preferably being coupled to the actuating lever via a worm drive, a hydraulic, pneumatic and/or electrical supply of the device can be dispensed with, such that the latter can be used independently as a mobile fitting device without an additional energy source.

As an alternative to the last-mentioned configuration, the punch can of course also be capable of being driven electrically, hydraulically or pneumatically via an auxiliary drive, in which case a continuous and reproducible force flow for the bending-in operation can be provided by such an auxiliary drive. Interruption of the bending-in operation can also be ruled out for this case. A stop for limiting the punch movement is then unnecessary, but deformation of the sealing element could be ruled out through the use of a force limiter for the auxiliary drive.

BRIEF DESCRIPTION OF THE DRAWINGS

The advantages emerging from the device likewise apply to the method according to the invention.

The invention is explained with reference to a drawing, in which.

DETAILED DESCRIPTION OF INVENTION

Figure 1:
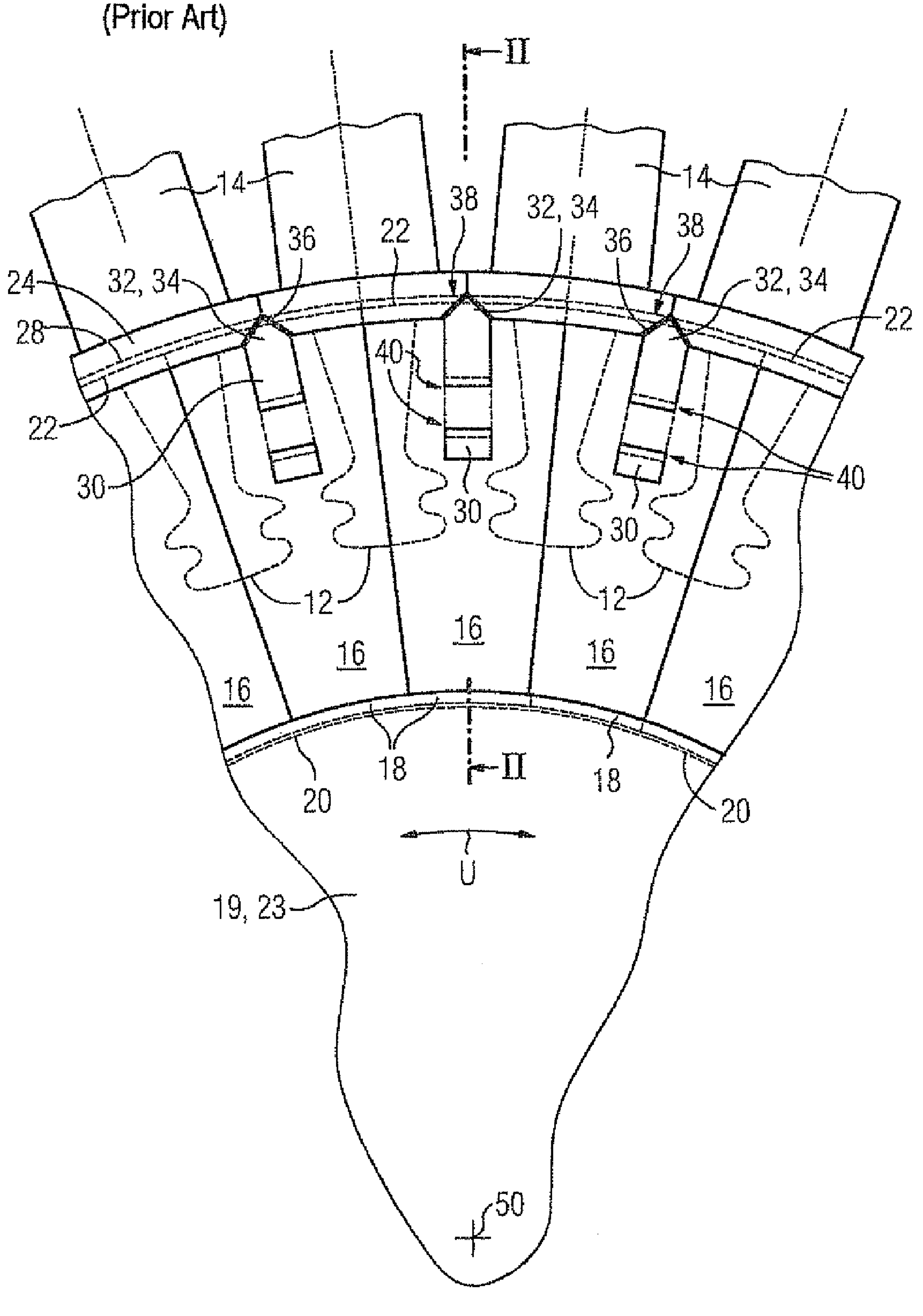
FIG 1 (Prior Art)
FIGS. 1, 2 show the arrangement for axially locking moving blades in a known rotor, in a plan view and in a cross-sectional view.
Figure 2:
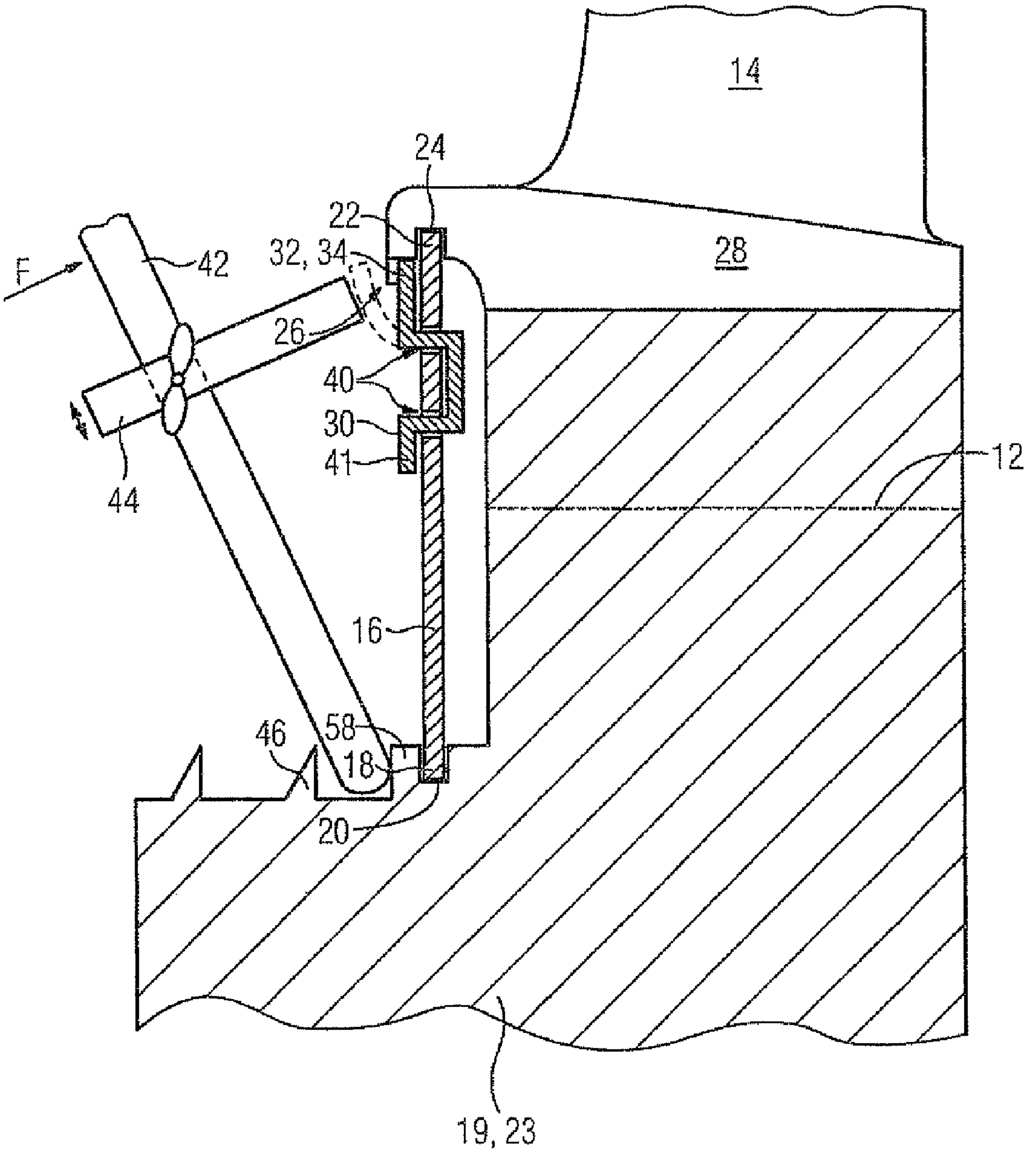
FIG 2 (Prior Art)
Figure 3:
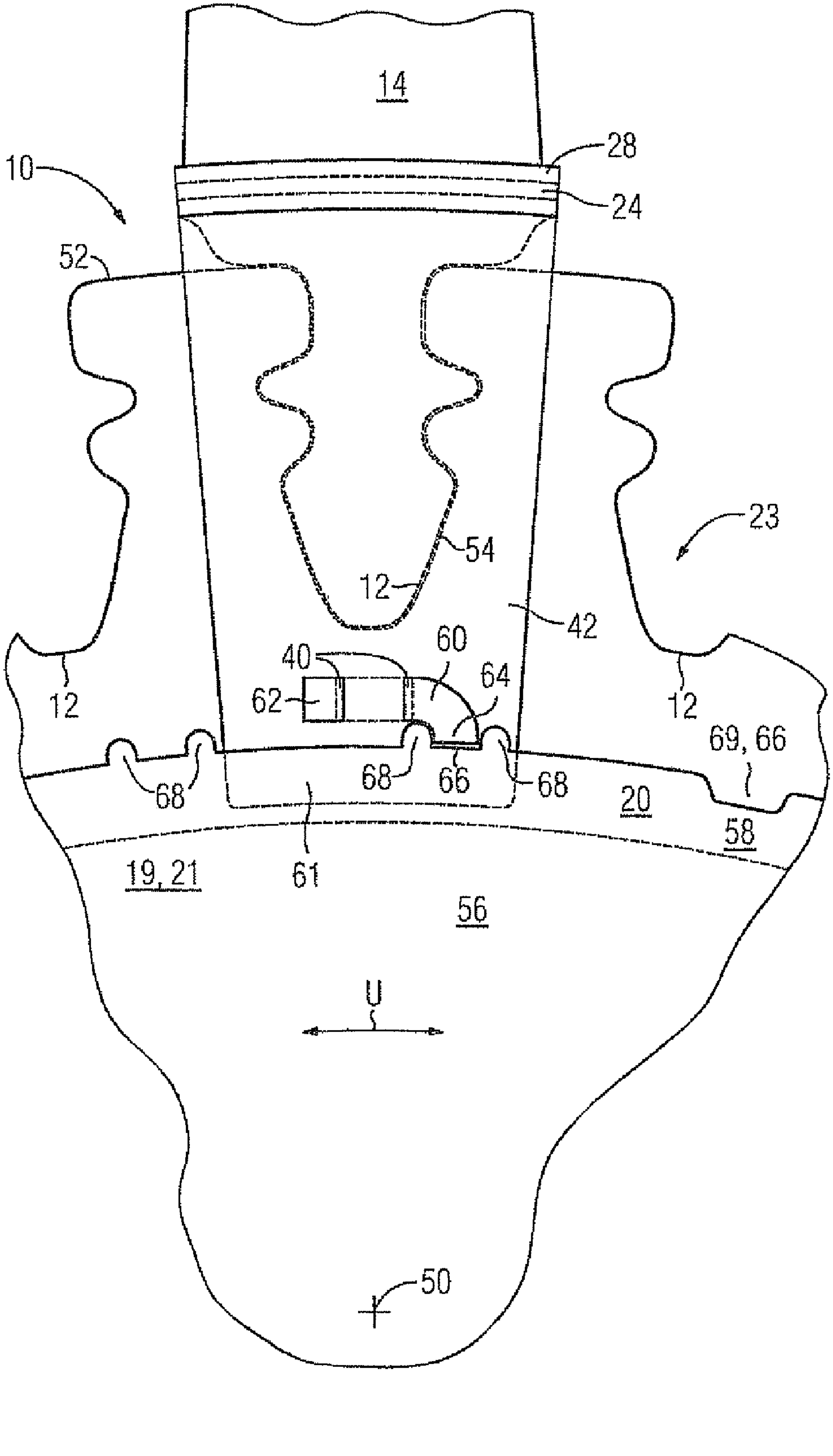
FIG. 3 shows the plan view of an alternative configuration of a sealing element having an L-shaped sheet-metal strip.

FIG. 3 shows a detail of the front-end plan view of the shaft collar 21, formed by a rotor disk 19, of a rotor 23 of a gas turbine. At its outer circumference 52, the rotor 23, which is rotatable about the rotation axis 50, has moving-blade retaining slots 12 which are distributed over the circumference U and extend in the axial direction and into which a respective moving blade 14 having a blade root 54 designed to correspond to the moving-blade retaining slot 12 can be pushed. A moving blade 14 is already pushed into place in the moving-blade retaining slot 12 shown centrally in FIG. 3. As in the prior art shown in FIGS. 1 and 2, an axially extending projection 58 or widened portion having an encircling circumferential slot 20 which is open radially outward therein is arranged on a front end of the rotor disk 19 or on a front-end side face 56 of the shaft collar 21. The circumferential slot 20 is arranged, for example, radially further on the inside than the moving-blade retaining slots 12. The moving blade 14 has a platform 28 which is arranged between the blade root 54 and the profiled airfoil and on whose underside a locking slot 24, open toward the encircling circumferential slot 20, is provided and is at the same time located opposite said circumferential slot 20. A sealing element 42 is inserted into the endlessly encircling circumferential slot 20 and into the locking slot 24 (cf. FIG. 2) and locks the moving blade 14 against a displacement along the moving-blade retaining slot. To this end, each sealing element 42 completely covers the front-end opening of one of the moving-blade retaining slots 12.

If necessary, the sealing elements 42 may also be distributed over the circumference in such a way that one half of each sealing element 42 locks one of the moving blades 14.

A fully fitted ring of sealing elements 42 forms a sealing ring which separates a region 37 through which a coolant can flow from a further region 39 in which a hot gas can possibly appear (cf. FIG. 2).

In order to lock the sealing element 42 against a displacement in the circumferential direction U, said sealing element 42 comprises a sheet-metal strip 60. The sheet-metal strip 60 is preferably provided at the inner end 61 of the sealing element 42 and fastened to the sealing element 42. The slots 40 necessary for this purpose and provided in the sealing element 42 extend in the radial direction. The sheet-metal strip 60 passed through these slots 40 and thus hooked to the sealing element 42 is bent at right angles and is therefore of essentially L-shaped design. Along its extent, it has a first leg 62 which extends in the circumferential direction U of the rotor 23 and with which the sheet-metal strip 60 is fastened to the sealing element 42. The second leg 64, extending inward in the radial direction, of the sheet-metal strip 60 engages in a pocket-like aperture 66 which is provided on the side face 56 of the shaft collar 21. On account of the shape of the sheet-metal strip 60 bent at right angles and of its comparatively short second leg 64, bending-up of the displacement locking arrangement by centrifugal force can be reliably avoided.

The aperture 66 is formed by two spaced-apart teeth or lugs 68 which project radially outward on the outer edge of the projection 58. Of course, the aperture 66 could also be formed by a recess 69. In this case, the length of the second leg 64 is to be adapted thereto.

Since the side regions of the second leg 64 bear against the side walls, in each case extending in the radial direction, of the aperture 66 or against the lugs 68, the sealing element 42 according to the invention is reliably locked against displacement in the circumferential direction U.

Figure 4:
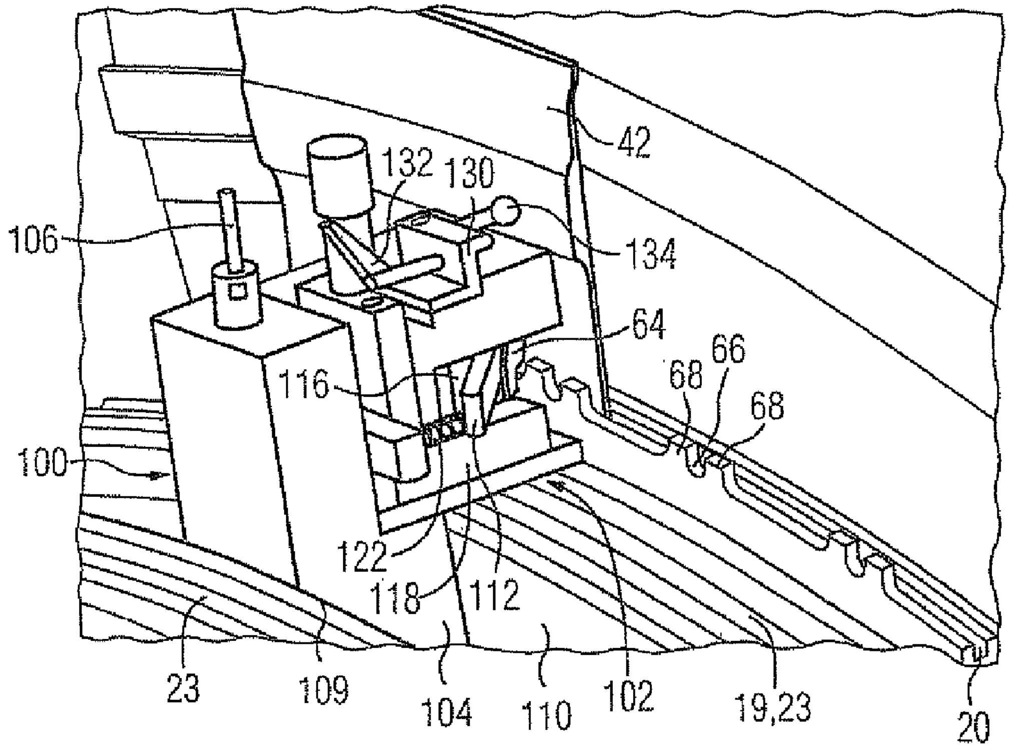
FIGS. 4 to 7 show a first configuration of the device according to the invention in different perspective views.
Figure 5:
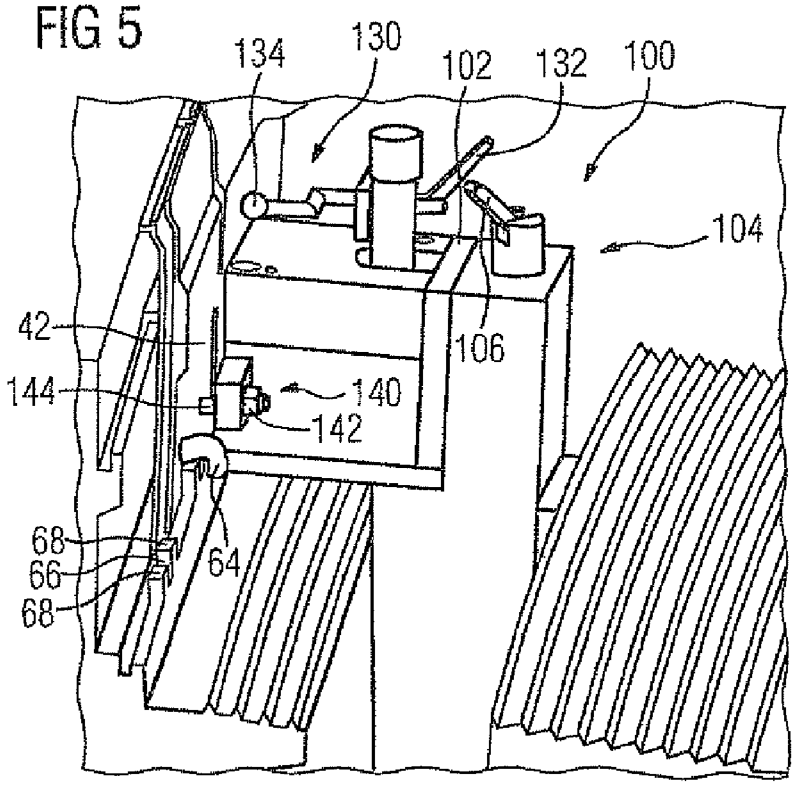
Figure 6:
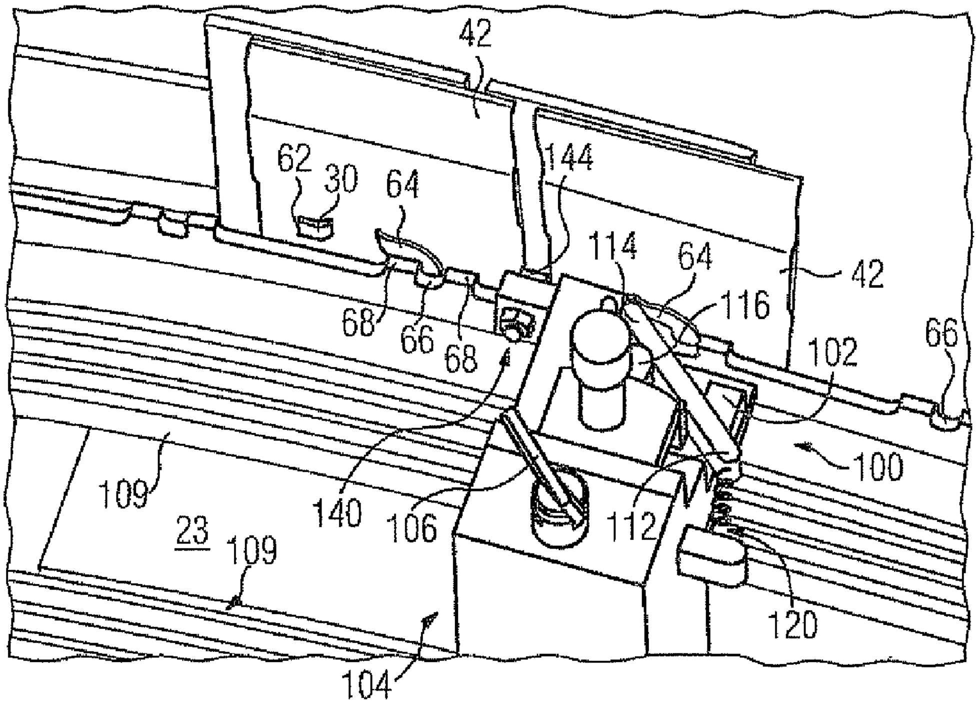
Figure 7:
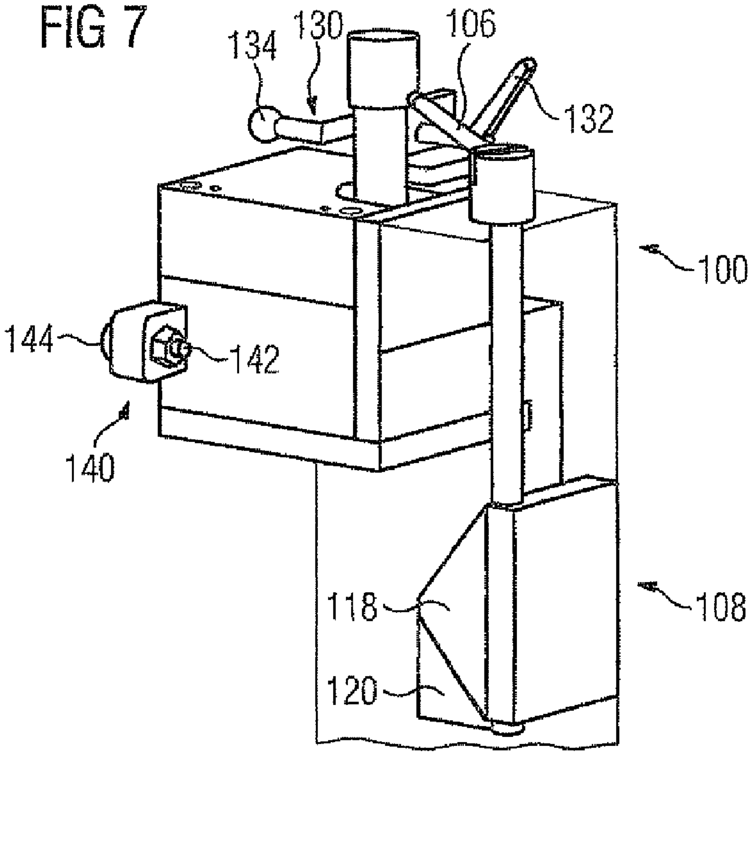

FIG. 4 shows, in a perspective illustration, the fitting device 100 for producing the arrangements for locking the sealing element 42 against a displacement in the circumferential direction U. The retaining slots provided in the rotor for the moving blades are not shown in FIGS. 4, 5 and 6. The fitting device 100 comprises a bending device 102 and a clamping device 104 for fastening the fitting device 100 to the rotor 23. The clamping device 104 is equipped with a restraining lever 106, by means of which the restraining means 108 (FIG. 7) can be restrained in a further circumferential slot 110 arranged on the rotor 23. To this end, two wedges 118, 120 displaceable relative to one another can be pressed in place under stress between the two side walls 109 of the further circumferential slot 110 by actuating the adjusting lever 106.

Furthermore, a setting aid 140 (FIG. 5) is provided on the mobile fitting device 100 for orienting the sealing element 42 relative to the rotor 23, by means of which setting aid 140 the sealing element 42 can be oriented relative to the rotor 23 or relative to the bending device 102. The setting aid 140 is designed as a screw-on setting element 142, the free end 144 of which serves as a stop for the sealing element 42.

The bending device 102 is equipped with a hydraulic cylinder 116 (not shown in detail), by means of which a punch 112 can be actuated. The punch 112 is pivotable about a rotation axis 114 (FIG. 6) which coincides at least approximately with the radial direction of the rotor 23. In the drawing shown in FIG. 4, the punch 112 is in a rest position. By the actuation of the hydraulic cylinder 116, the punch 112 can be moved out of the rest position for bending the sheet-metal strip 30.

On account of the pivoting movement of the punch 112 about the rotation axis 114 running in the radial direction, a force component acting in the circumferential direction U of the rotor 23 also acts on the sealing element 42, such that the latter can be temporarily locked against a displacement in the circumferential direction U during the operation for bending in the sheet-metal strip 30. To this end, a fixing means 130 is provided. The fixing means 130 essentially comprises a manually actuable lever 132 with a stop element 134 which is coupled thereto and by means of which the sealing element 42 can be pressed against the front end of the rotor 23. In particular, the sealing element 42 can be pressed against the circumferential slot 20 and against the moving blade (cf. FIG. 2) to be locked, which is hidden in FIG. 4. If a displacement of the sealing element 42 in the circumferential direction U were to take place during the bending process, the second leg 64 of the sheet-metal strip 30 would not be bent into the aperture 66, since the orientation of the sealing element 42 relative to the rotor disk 19 would be incorrect and in this case the second leg 64 would come to bear at the front end against one of the two lugs 68. It is not until after a correction that the second leg 64 of the sheet-metal strip 30, in a second attempt, could be bent in, although work-hardening of the sheet-metal strip 30, which has occurred in the meantime, could impair the reliability of the locking.

The fitting begins with the insertion of the sealing element 42, pre-fitted with a sheet-metal strip 60, and with the placing of the fitting device 100 against the rotor 23. The second leg 64 of the sheet-metal strip 60 pre-fitted on the sealing element 42 still projects away from the sealing element 42 (cf. FIG. 5). The fitting device 100 is then positioned along the rotor circumference and is then secured to the rotor 23 by the restraining of the clamping device 104, such that the bending device 102 sits firmly on the rotor in a secure and fixed manner during the bending operation.

After that, the sealing element 42 is displaced along the circumferential slot 20 until it bears against the stop 144 of the setting aid 140. As a result, correct orientation of the sealing element 42 relative to the fitting device 100 and the bending device 102 is achieved, such that the punch 112 can act on the second leg 64 as planned.

The sealing element 42 is then pressed against the rotor 23 by means of the stop element 134 for the duration of the bending operation, such that said sealing element 42, despite the acting bending force, is not displaced in the circumferential direction U.

Before the bending operation, the punch 112 of the bending device 102 bears against the second leg 64, which still protrudes. By the extension of the hydraulic cylinder 116, the punch 112 is swung out of its rest position, as a result of which the second leg 64, which is in contact in the meantime, is bent into the aperture 66 in a single bending operation. In this case, the maximum stroke of the hydraulic cylinder 116 is dimensioned in such a way that buckling of the sealing element 42 is reliably avoided. As a result of the components and tools being oriented correctly to one another in each case, a bending-in operation free of problems can take place.

After the section 65 of the sheet-metal strip 30 has been bent in, the punch 112 is moved back into the rest position by a return spring 122. The bending-in operation is thus complete. To release the fitting device, the stop element 134 is then to be loosened from the sealing element 42 and the clamping device 104.

Figure 8:
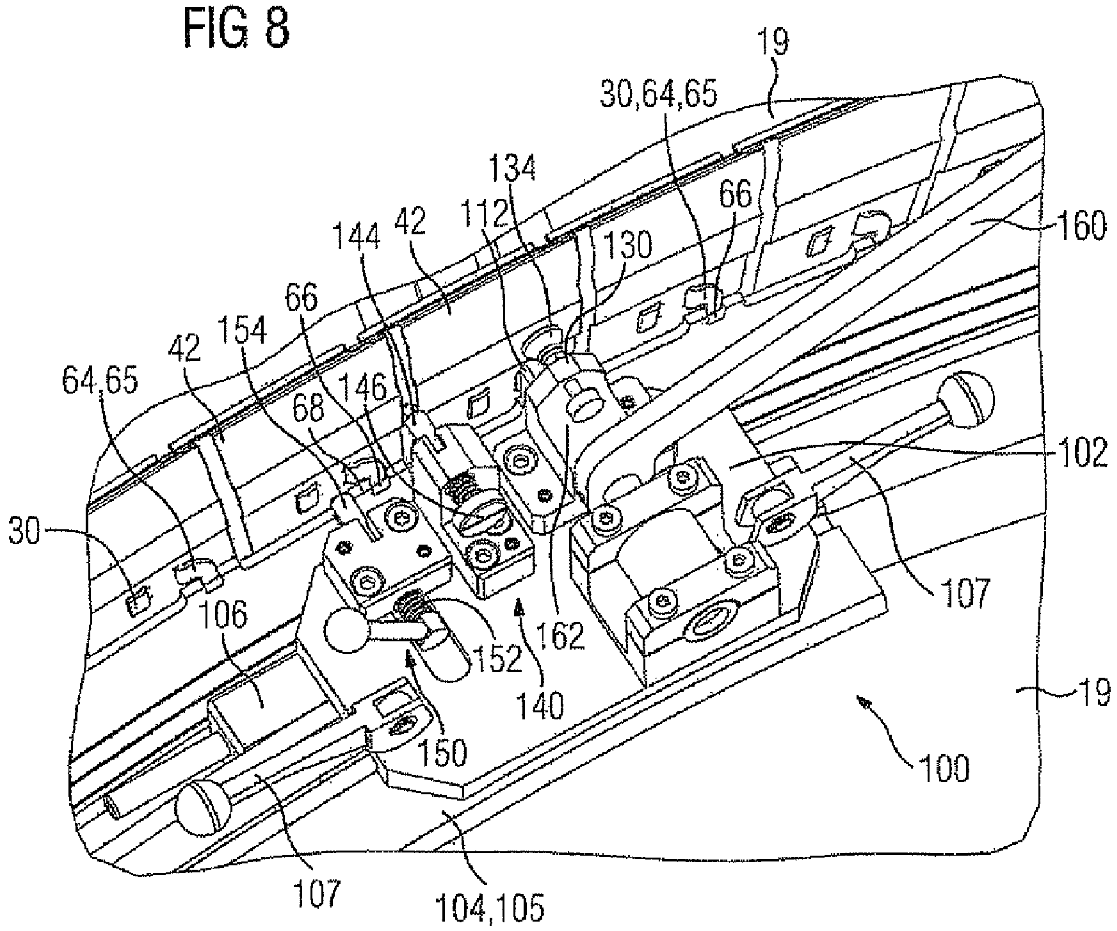
FIG. 8 shows a second configuration of a fitting device in a three-dimensional, perspective view.

A second configuration of the invention is shown in perspective in FIG. 8. The fitting device 100 comprises a clamping device 104, a bending device 102 and also a positioning aid 150 and a setting aid 140. The clamping device 104 is designed as an interchangeable fixture 105 which can be fixed in two holes of adjacent rotor disks 19 and can be clamped in place between the rotor disks 19 by means of a plastic lever 106. In this case, the fixture 105 is not in contact with the sealing tips of the rotor 23 and therefore cannot damage said sealing tips. The bending device 102 can be put onto the fixture 105, can be displaced along the latter and—at the correct position—can be fastened thereto. The bending device 102 is oriented relative to the circumference of the rotor by means of a positioning aid 150. The positioning aid 150 arranged on the bending device 102 comprises at least one screw 152, the thread-side end 154 of which can be placed against a lug 68 or tooth provided on the rotor 23. As a result, the bending device 102 is positioned exactly relative to the turbine disk 19 and the punch 112 is positioned exactly relative to the relevant aperture 66. The bending device 102 is then clamped in place on the fixture 105 by two levers 107. After that, the sealing element 42, which is still displaceable, is positioned relative to the fitting device 100 and relative to the rotor 23 by means of the setting aid 140. The setting aid 140 arranged on the bending device 102 comprises a stop which is the free end 144 of a screw 146. The sealing element 42 is displaced along the circumferential slot 20 until it bears against the free end 144. It is then positioned exactly relative to the aperture 66, such that the second leg 64 can be bent exactly into the aperture 66 during the subsequent bending-in operation. In order to prevent a displacement of the sealing element 42 relative to the aperture 66, the sealing element 42 is still temporarily fixed, i.e. for the duration of the bending operation, by means of a stop element 134 before the sheet-metal strip 30 is bent into the aperture 66.

The operation for bending in the section 65 of the sheet-metal strip 30 is initiated by the manual actuation of the lever 160. Via a worm thread 162 (only shown schematically), the actuating lever 160 drives the punch 112, which bears against the section 65 of the sheet-metal strip 30 during its stroke movement. Due to the continued movement, said punch 112 bends the section 65 until the latter engages in the aperture 66 provided for it and comes to bear against the sealing element 42.

On account of the correct orientation of all the participating elements and tools relative to one another in each case, it can be ensured that the bending-in operation can always be carried out in a single bending-in process without interruption, such that the initial work-hardening of the material of the sheet-metal strip 30 does not occur until in the desired end position.

On the whole, the two mobile fitting devices 100 each offer a simple and cost-effective possibility of bending in the sheet-metal strips 30 according to requirements. Each fitting device 100 can in this case be individually adapted to the individual stages of a turbine on account of the clamping device 104 which can be released from the bending device 102. On account of the compact type of construction of the fitting device 100, said fitting device 100 can even be used if the rotor 23 consisting of a plurality of rotor disks 19 is already restrained by means of a tie rod. By different contrivances, both the bending device 102 and the fitting device 100 are exactly oriented relative to the rotor 23, such that reliable bending-in is ensured. The use of the fitting device 100 permits continuous and reproducible bending operations, which provide for a uniformly high quality of the fitting of sealing elements 42.

The invention claimed is:

1. A fitting device for producing an arrangement for locking a sealing element, arranged at a front end on a rotor of a turbine, against a displacement in a circumferential direction, the sealing element locking moving blades arranged on the rotor against an axial displacement, comprising:

- a clamping device for fastening the fitting device to the rotor;
- a bending device fastened to the clamping device and having a punch movably mounted on the bending device for producing the arrangement by bending a section of a sheet-metal strip arranged on the sealing element into an aperture provided on the rotor; and
- a fixing device for locking the sealing element against an undesirable displacement in the circumferential direction during a bending-in operation.

2. The fitting device as claimed in claim 1, wherein the fixing device comprises an adjustable lever having a stop element coupled to the lever and which the sealing element can be pressed against the rotor.

3. The fitting device as claimed in claim 1, wherein the clamping device is releasably fastened to the bending device.

4. The fitting device as claimed in claim 1, wherein the clamping device comprises a restraining device that is actuated by a restraining lever and is restrained together with the rotor.

5. The fitting device as claimed in claim 4, wherein the restraining device encloses an undercut of the rotor provided in a further circumferential slot of the rotor.

6. The fitting device as claimed in claim 4, wherein the restraining device is restrained between two side walls of the further circumferential slot of the rotor.

7. The fitting device as claimed in claim 1, further comprising a positioning aid for positioning the bending device in the circumferential direction of the rotor.

8. The fitting device as claimed in claim 7, wherein the positioning aid is a screw where the thread-side end is placed against a lug provided on the rotor.

9. The fitting device as claimed in claim 1, further comprising a setting aid for orienting the sealing element relative to the rotor or relative to the fitting device.

10. The fitting device as claimed in claim 9, wherein the setting aid is a screw-on setting element having a free end which is a stop for a projection provided on the sealing element.

11. The fitting device as claimed in claim 1, wherein to bend the sheet-metal strip, the punch is pivoted from a rest position in a lever-like manner about a longitudinal axis extending transversely to the axial direction of the rotor.

12. The fitting device as claimed in claim 1, wherein the punch is displaced from a rest position in the axial direction of the rotor by an actuator stroke necessary for bending the sheet-metal strip.

13. The fitting device as claimed in claim 1, further comprising a stop for limiting the punch movement.

14. The fitting device as claimed in claim 1, wherein the punch is driven manually via an actuating lever.

15. The fitting device as claimed in claim 14, wherein the punch is coupled to the actuating lever via a worm drive.

16. The fitting device as claimed in claim 1, wherein the punch is driven electrically, pneumatically or hydraulically by an auxiliary drive.

17. A method of producing the arrangement for locking a sealing element, arranged at the front end on a rotor of a turbine, against a displacement in the circumferential direction, comprising:

- providing a pre-fitted sheet-metal strip with the sealing element;
- arranging the sealing element on the rotor;
- bending a section of the sheet-metal strip into an aperture provided on the rotor wherein between the arrangement of the sealing element on the rotor and the bending-in of the section, the sealing element is temporarily fixed against a displacement in the circumferential direction of the rotor for the duration of the bending-in operation; and
- placing a fitting device against the rotor, wherein the fitting device comprised:
  - a clamping device for fastening the fitting device to the rotor;
  - a bending device fastened to the clamping device and having a punch movably mounted on the bending device for producing the locking arrangement by bending a section of a sheet-metal strip arranged on the sealing element into an aperture provided on the rotor; and
  - a fixing device for locking the sealing element against an undesirable displacement in the circumferential direction during a bending-in operation, and
- fastening the fitting device to the rotor.

18. The method as claimed in claim 17, wherein, between the placing of the fitting device against the rotor and the fastening of the fitting device to the rotor, the fitting device is displaced in the circumferential direction of the rotor until a positioning aid indicates the intended operating position of the bending device.

19. The method as claimed in claim 18, wherein the sealing element is positioned in the circumferential direction using a setting aid after fastening the fitting device to the rotor.

* * * * *